Patented Nov. 3, 1936

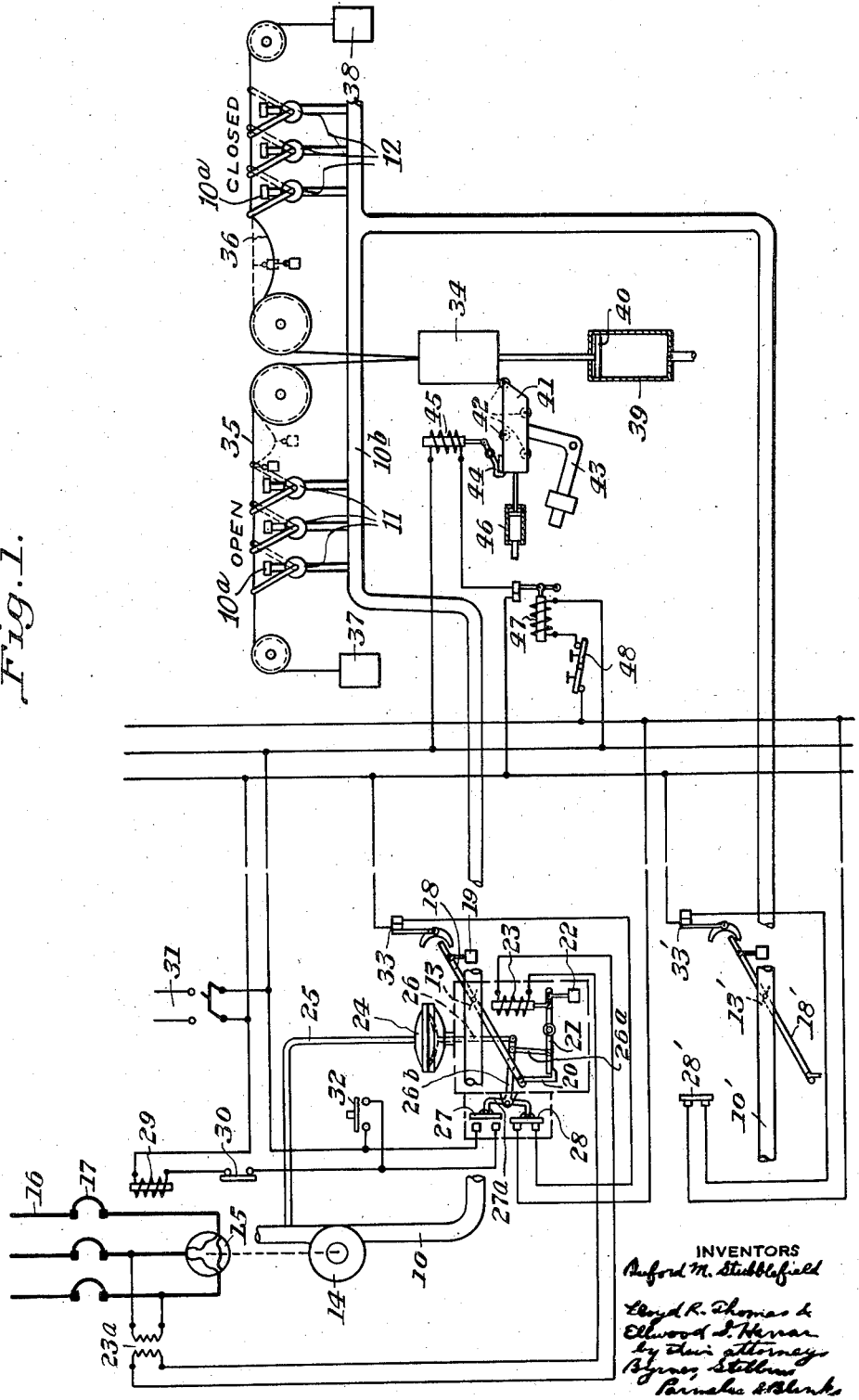

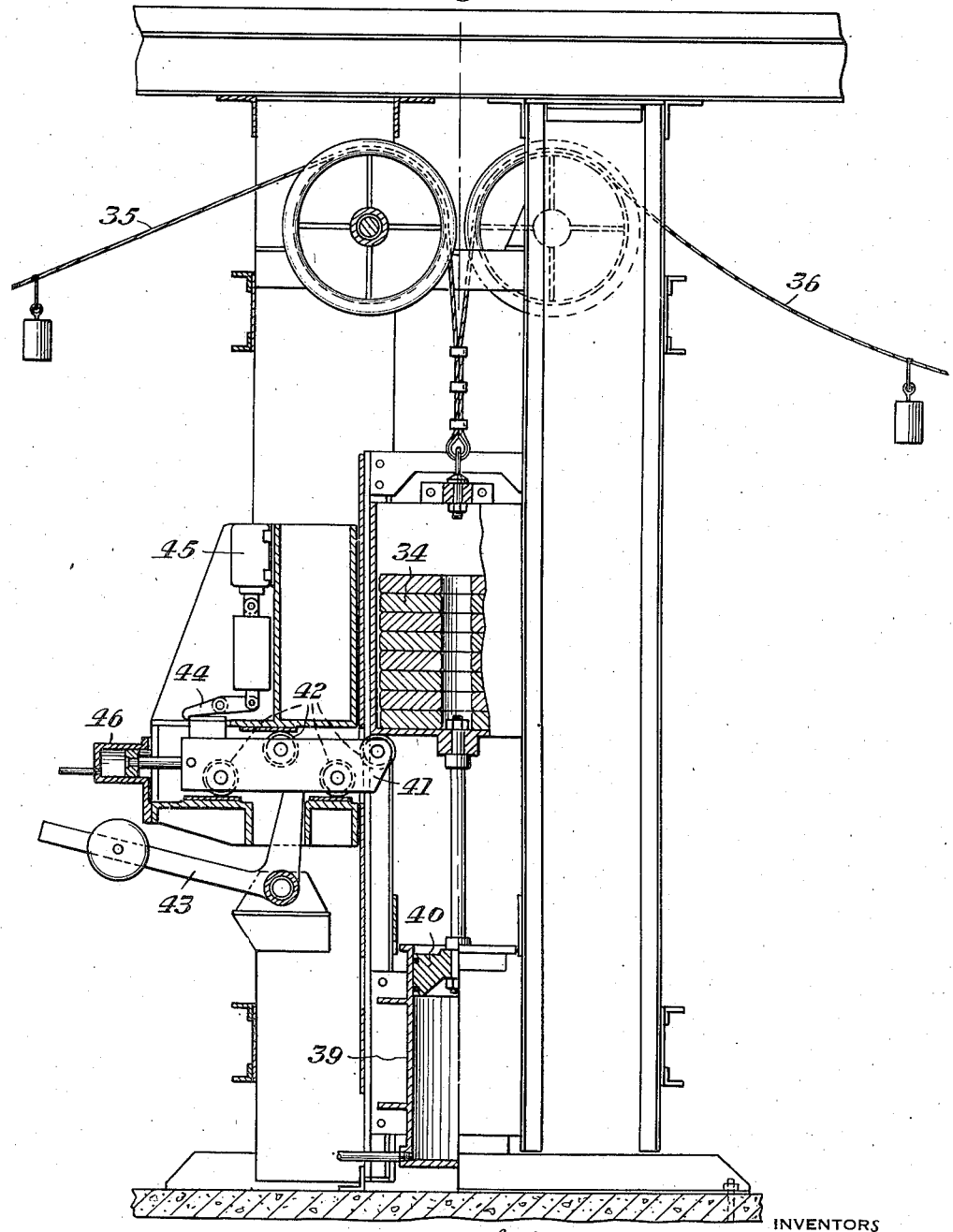

2,059,411

UNITED STATES PATENT OFFICE 2,059,411

AUTOMATIC VALVE CONTROL

Buford M. Stubblefield, Poland, and Lloyd R. Thomas and Ellwood S. Harrar, Youngstown, Ohio, assignors to The Youngstown Sheet & Tube Company, Youngstown, Ohio, a corporation of Ohio Application February 14, 1933, Serial No. 656,674

9 Claims. (Cl. 48—192)

Our invention relates to the automatic control of valves and, in particular, to the control of valves in fuel supply lines, although it is not limited strictly thereto but has other useful applications.

In many instances, it has been found desirable to close fuel supply lines upon a decrease in the pressure of the fuel in the line, or upon failure of the fuel supply. This is necessary to avoid the obvious hazard resulting from back-firing through the supply line which may occur in cases where the pressure of the fuel being delivered to a burner in operation drops below that of the atmosphere so that the combustion zone is actually drawn back into the supply line. Manual operation of the control valves in a fuel line to avoid this hazard is obviously unsatisfactory because of the uncertainties thereof and the difficulty of insuring the desired operation so as to afford any kind of protection against back-firing. A particular application of this problem is in the use of blast furnace gas in steel mill auxiliaries such as coke ovens. The supply of blast furnace gas, of course, varies with the operation of the furnace and may at times decrease to zero. Under such conditions, obviously, it would be desirable to have some automatic apparatus for closing the valves in the supply lines to prevent back-firing. In some instances, the pressure in fuel supply lines is maintained by booster blowers driven by electric motors. In these instances, failure of the supply current for the booster motors results in a drop in the fuel pressure at the point of consumption. This occurrence also gives rise to the same hazard above mentioned, namely, that the flame from the burner will be drawn back into the line on failure of pressure therein.

We have invented a system for guarding fuel supply lines against the dangers above pointed out whether due to failure of the pressure in the fuel line or to the interruption of the operation of a booster motor, if such is employed. In accordance with our invention, we provide an automatic valve closing arrangement effective upon the occurrenec of either of the conditions mentioned to close the valves immediately to prevent back-firing.

In certain fuel burning applications, duplicate burners are employed in alternate cyles, one set of burners operating while another set is idle. This operation requires that the valves of the burners of the respective groups be alternately closed and opened in a predetermined sequence. Our invention also includes means applicable to such installations for closing all valves upon the occurrence of a drop in the pressure in the fuel line or the failure of the current supply for the booster motor.

Our invention is also characterized by the further advantage that it can be utilized to maintain the supply of fuel from one of a plurality of sources delivering to a common load, as long as any one of said sources remains effective for delivering fuel. Each individual fuel supply line will be shut down as the supply of fuel fails and upon the closing of the control valve in the last line remaining in operation, the burner valves supplied thereby will also be closed, together with the main valve.

For a complete understanding of the invention, reference is made to the accompanying drawings illustrating a present preferred embodiment. In the drawings:

Figure 1 is a diagrammatic showing of the invention and the electric circuits and apparatus associated therewith; and Figure 2 is a side elevation with parts in section, showing a portion of the apparatus schematically shown in Figure 1.

Referring in detail to the drawings, fuel is supplied by a conduit 10 to burners 10a through valves arranged in groups 11 and 12. The fuel may, for example, be blast furnace gas although the invention is applicable, of course, to the control of other types of fuel. For the purpose of the present description, it will be assumed that the burners controlled by the valves in the groups 11 and 12 are installed in a coke oven and that it is desired to fire the oven in opposite directions at intervals, necessitating periodic reversal of the positions of the burner valves. It will be assumed that the valves in the group 11 are initially in the open position and that the valves in the group 12 are in the closed position. The mechanism for periodically reversing the valves forms no part of the present invention and is not illustrated for that reason. The conduit 10, of course, is connected to a suitable header 10b having branches leading to the valves in the groups 11 and 12.

The conduit 10 is provided with a main control valve which may be of the butterfly type shown at 13. A booster blower 14 may be connected in the conduit 10. A motor 15 for driving the booster 14 derives its energy from a supply circuit 16 through a circuit breaker 17.

The main valve 13 has an operating lever 18 provided with a counterweight 19 which tends to close the valve. Closure of the valve is ordinarily prevented by a latch 20 pivoted to the lever 18, which engages under the end of a pivoted arm 21. A counterweight 22 tends to swing the arm 21 in a clockwise direction but an electromagnet 23 opposes this tendency. A transformer 23a maintains the electromagnet 23 energized as long as the circuit breaker 17 is closed and normal voltage exists across the supply line.

A pressure responsive diaphragm 24 is subject to the pressure on the intake side of the booster blower 14 by means of a connection 25.

A linkage composed of members 26, 26a and 26b is provided for operating contacts 27 and 28 mounted on a pivoted yoke 27a, upon the occurrence of either of the conditions the system is intended to guard against. The link 26 is connected to the diaphragm 24. The link 26a is pivoted to the arm 21. The link 26b is fixed to the yoke 27a. The links are pivotally connected as shown, and the parts are so arranged and designed that, if either the magnet 23 or the diaphragm 24 becomes ineffective because of a decrease in the voltage or pressure, the link 26b will move to close the contact 27 and open the contact 28.

A tripping coil 29 operates when energized to open the circuit breaker 17. The circuit of this tripping coil includes an auxiliary contact 30 which is closed when the circuit breaker 17 is closed, and a source of control current 31. The circuit may be closed either by the contact 27 or by a push button 32 located in a convenient point for manual operation. Rotation of the lever 18 in a clockwise direction opens a set of contacts shown at 33 for a purpose to be described later.

The apparatus for closing all of the burner valves in groups 11 and 12 upon the occurrence of the specified conditions includes a counterweight 34 and cables 35 and 36 traversing suitable guiding sheaves, connected to the operating levers of the valves and provided with counterweights 37 and 38. A cylinder 39 having a piston 40 therein is provided for raising the counterweight 34. A detent 41 having anti-friction rolls 42 thereon is adapted to hold the counterweight 34 in elevated position. A counterweighted bell crank 43 tends to retract the detent 41 but the latter is normally held in forward position by a latch 44 operated by an electromagnet 45. A cylinder 46 having a piston therein connected to the detent 41 is provided for resetting the latter.

The electromagnet 45 is controlled by a relay 47, the circuit of which is controlled by the contacts 28 and 33, and a push button switch 48.

In describing the operation of the invention, we shall assume that the various members occupy the positions illustrated in Figure 1 and that the switch connecting the various control circuits to their supply source 31 is closed. As long as the pressure on the intake side of the booster blower 14 and the voltage of the source 16 are both maintained above predetermined values, no change in the system occurs except for the periodic reversal of the valves in the groups 11 and 12. It will be evident that on the reversal of the valves 11 to the dotted line position, the cable 35 will be slacked and the cable 36 tightened. The counterweights 37 and 38 move slightly in response to the operation of the valve reversing mechanism. The counterweight 34 is maintained in its upper position by the detent 41.

With the parts in their illustrated positions, a circuit is completed for the coil of the relay 47 from one side of the supply circuit through contact 33, contacts 28, push button switch 48 and the winding of the relay 47 to the other side of the supply circuit. The control source is preferably a storage battery to insure continuity of protection. The contacts of the relay 47 being maintained closed, an obvious energizing circuit is provided for the electromagnet 45. The latch 44 is thus held in position to maintain the detent 41 in the illustrated position.

If the pressure of the fuel on the intake side of the booster blower 14 should decrease for any reason, such as the reduction of the blast on the furnace, the diaphragm 24 is immediately released and, since the magnet 23 above is not strong enough to hold the links 26, 26a and 26b in their illustrated positions, they move so as to close contact 27 and open contact 28, as previously described. This movement causes the arm 21 to release the hook 20. The counterweight 19 is then effective to turn the lever 18 in a clockwise direction to close the valve 13. The operation of the lever 18 opens the contact 33. The closing of the contact 27 completes the circuit for the tripping coil 29, whereby the circuit breaker 17 is immediately opened. The electromagnet 23 is thereby deenergized. The tripping circuit is simultaneously opened at the contact 30.

The opening of the contacts 33 or 28 interrupts the circuit for the winding of the relay 47. The latter immediately opens its contacts to deenergize the electromagnet 45. The latch 44 is thereby raised to permit the counterweighed bell crank 43 to retract the detent 41. The counterweight 34 is thereby released and falls, shifting the valves of one of the groups 11 and 12 to the closed position and holding the valves of the other group in that position. It will be understood that the valves of the group 11 are shown in solid lines in the open position while the valves 12 are shown in solid lines in the closed position.

It will be apparent from the foregoing description that any decrease in the pressure of the supply main causes an immediate closure of the main valves as well as the burner valves and the disconnection of the booster motor from its supply circuit.

The same result will follow if the voltage of the circuit 16 drops to a value insufficient to insure continued operation of the motor 15 and the blower 14. If the voltage of the circuit 16 fails or decreases, the energization of the electromagnet 23 is correspondingly reduced. The counterweight 22 thereupon turns the arm 21 in a clockwise direction, closing contact 27 and opening 28, as before, permitting the counterweight 19 to turn the valve-operating lever 18 in the same direction. The diaphragm 24 and the electromagnet 23, of course, may be adjusted to operate at any desired reduction in pressure or voltage.

When the supply of fuel or current has been resumed, the valve control system may be restored to normal very easily. The arm 21 and link 26 are first manually held in their illustrated positions. The circuit breaker 17 is then closed manually, or otherwise, to start the motor 15. The electromagnet 23 is thereby energized to help the diaphragm 24 hold the linkage in reset position. As the pressure of the fuel on the intake side of the blower returns, the diaphragm 24 holds the link 26 down. It is now possible to open the valve 13 manually and to engage the hook 20 under the end of the arm 21 and the joint effect of the diaphragm and magnet is to hold it in that position. The manipulation of the arm 21 and link 26 opens contact 27 and closes contact 28. The opening of the valve 13 closes the contact 33. The closing of the contacts 28 and 33 reenergizes the relay 47 and the electromagnet 45. The application of fluid pressure to the cylinders 39 and 46 causes the counterweight 34 to be raised and the detent 41 to be moved forward until the hook 44 engages the rear end of the latter. One of the groups of valves 11 and 12 may then be opened and operation of the coke oven resumed, with periodic reversals of the positions of the valves in the two groups.

The push button 32 is provided for the purpose of permitting the main valve 13 and the burner valves to be closed under manual control. The push button switch 48 similarly provides manual control of the counterweight 34 without affecting the main valve 13.

It will be apparent that the invention provides means for automatically closing both the main and auxiliary valves of the fuel supply system upon a decrease in the pressure in the supply main either through failure of the fuel supply or the operation of the fuel delivering means. The invention is applicable not only to a single supply conduit and a single set of burners for reverse firing, but can be duplicated where a number of supply means deliver fuel to a common consumption device or where a number of such devices draw fuel from one or more supply sources. By duplicating the control circuits in the apparatus shown, for each supply conduit and set of burner valves to be controlled, in the case of a number of supply conduits feeding a common load, a decrease in the pressure in any supply line will cause that line to be cut off. The burner valves of the individual groups, however, will remain open since the circuit for the relay 47 will be established through contacts of other valve control mechanisms corresponding to contacts 28 and 33 of Figure 1. As long as there is at least one main conduit supplying fuel, therefore, all the burner valves will be maintained open. Upon the failure of pressure in the last conduit, all burner valves will be closed, as well as the main valve in that particular conduit by the opening of the circuit for the relay 47. The main valve control mechanism is partly duplicated in Figure 1, elements of the duplicate circuit being indicated by reference numerals corresponding to those of the complete system, with a prime affixed thereto. A very flexible control system is thus provided insuring continued operation of the burners as long as there is any fuel available and, at the same time, disconnecting any conduit wherein the pressure fails.

The system is simple and comparatively inexpensive but at the same time, it is positive in operation and provides a high degree of safety against back-firing from burners due to reductions in the pressure of the fuel. While we have described the invention as applied to the protection of lines supplying blast furnace gas to coke ovens, it will be apparent that the invention may be applied also to various other installations where similar conditions are to be guarded against.

Although we have illustrated and described herein but a single present preferred embodiment of the invention, it will be apparent that numerous changes in the system disclosed may be made without departing from the spirit of the invention or the scope of the appended claims.

We claim:

1. In a fuel supply system, the combination with a plurality of main supply conduits, a cut-off valve in each of said conduits, and a plurality of valves for controlling the flow of fuel from said conduits to consuming devices, of means responsive to the pressure of fuel in each supply conduit for closing the valve therein, means for closing the valves on said consuming devices, and means effective as long as one of said main valves is open for preventing operation of said last-mentioned means.

2. In a fuel supply system, the combination with a plurality of main supply conduits, a control valve in each of said conduits, a plurality of individual valves controlling the flow of fuel from said conduits to consuming devices, of means responsive to the pressure in each of said conduits for closing the valve therein, means for closing said individual valves, and means for preventing operation of said last-mentioned means until all said main conduit valves have been closed.

3. In a fuel supply system, the combination with a main supply conduit, a main valve therein, and a valve for controlling the flow of fuel from said conduit to a consumer, of means for closing the consumer valve, and means operative as long as said main valve is open for preventing operation of the consumer valve closing means.

4. In a fuel supply system, the combination with a main supply conduit, a valve therein, closing means for the valve, means for moving fuel through said conduit and a motor for driving said means, of means responsive to the pressure in said conduit and means responsive to the energization of said motor, and a common member controlled by said two last-mentioned means for preventing operation of said closing means.

5. In a fuel distribution system, the combination with a supply conduit, a main valve therein, and an auxiliary valve controlling the flow of fuel from said main conduit, of means responsive to a drop in the pressure in the main conduit, means controlled thereby effective to close said main valve, and means actuated by closing of the main valve effective to close the auxiliary valve.

6. The combination defined by claim 5 characterized by a plurality of main conduits supplying a distribution system in common, each having a main valve, and means rendered operative as long as a main valve in any one conduit remains open, for preventing operation of the auxiliary valve closing means.

7. In a fuel supply system, the combination with a pump or blower, a conduit for delivering fuel thereto, a conduit for delivering fuel from the pump or blower to a point of use, and a motor driving said pump or blower, of means responsive to the pressure in said first-mentioned conduit effective when operated to stop said motor.

8. In a fuel supply system, the combination with a main supply conduit, a valve therein, means for closing the valve, and means responsive to the pressure on the inlet side of the valve for actuating the valve closing means on a decrease in said pressure resulting from failure of the fuel supply.

9. In a fuel supply system, the combination with a pump normally operating to deliver fuel, a conduit for conveying fuel to the pump, and a conduit for conveying fuel from said pump to a point of use, of means responsive to the pressure in said first-mentioned conduit for stopping said pump.

BUFORD M. STUBBLEFIELD.
LLOYD R. THOMAS.
ELLWOOD S. HARRAR.